(12) United States Patent
Grifoni (10) Patent No.: US 9,826,375 B2
(45) Date of Patent: Nov. 21, 2017

(54) SYSTEM AND METHOD FOR SOCIAL NETWORKING AMONG MUTUALLY-INTERESTED USERS

(71) Applicant: Rufus Armor, LLC, Los Angeles, CA (US)

(72) Inventor: Gabriel Grifoni, Los Angeles, CA (US)

(73) Assignee: Rufus Labs, Inc., Dover, DE (US)

( * ) Notice: Subject to any disclaimer, the term of this patent is extended or adjusted under 35 U.S.C. 154(b) by 469 days.

(21) Appl. No.: 14/275,089

(22) Filed: May 12, 2014

(65) Prior Publication Data
US 2015/0326682 A1    Nov. 12, 2015

(51) Int. Cl.
  *H04W 4/20* (2009.01)
  *H04L 29/08* (2006.01)
  *H04W 4/02* (2009.01)

(52) U.S. Cl.
  CPC ............ *H04W 4/206* (2013.01); *H04L 67/16* (2013.01); *H04L 67/18* (2013.01); *H04L 67/24* (2013.01); *H04L 67/306* (2013.01); *H04W 4/023* (2013.01)

(58) Field of Classification Search
  CPC ...... H04W 4/023; H04W 4/206; H04L 67/16; H04L 67/18; H04L 67/24; H04L 67/306
  See application file for complete search history.

(56) References Cited

U.S. PATENT DOCUMENTS

| | | | | |
|---|---|---|---|---|
| 5,950,200 A | * | 9/1999 | Sudai | ............... H04M 3/42008 |
| 6,249,282 B1 | * | 6/2001 | Sutcliffe | ............... G06Q 30/02 |
| | | | | 707/999.006 |
| 6,253,202 B1 | * | 6/2001 | Gilmour | ............. G06F 17/3061 |
| 6,735,568 B1 | * | 5/2004 | Buckwalter | ........... G06Q 30/02 |
| | | | | 705/319 |
| 7,069,308 B2 | * | 6/2006 | Abrams | ................ G06Q 10/10 |
| | | | | 705/319 |

(Continued)

OTHER PUBLICATIONS

Gupta, Monika "Broadcom's Latest GPS Tech Zooms in on Geofencing", http://blod.broadcom.com/wirless-technolody/ahead-of-mobile-world-congress-broadcoms-latest-gps-tech-zooms-in-on-geofencing/, (Feb. 19, 2013).

(Continued)

*Primary Examiner* — Backhean Tiv
(74) *Attorney, Agent, or Firm* — Tsircou Law, P.C.

(57) ABSTRACT

The present invention provides computer-implemented systems and methods directed to facilitating communication between users in close proximity who have indicated a mutual interest in one another. The exemplary method generally comprises the following steps: affiliating a first and a second user with an interactive network. The system then receives and stores user selected profiles and associates those profiles with each user. Users can browse these profiles and select profiles in which they are interested. If the system receives data indicating that two users have mutually selected each other's profiles, the system pairs these users. The system receives geo positioning data from each mobile device and utilizes this data to determine if users are in close proximity. If the system determines that users are in close proximity, then the system determines if the users have mutually selected the other's profile as a profile of interest, e.g., matched users.

20 Claims, 5 Drawing Sheets

(56) References Cited

U.S. PATENT DOCUMENTS

| | | | |
|---|---|---|---|
| 7,085,806 B1* | 8/2006 | Shapira | G06Q 30/08 705/1.1 |
| 7,092,952 B1* | 8/2006 | Wilens | G06Q 30/02 |
| 7,203,674 B2* | 4/2007 | Cohen | G06Q 10/02 |
| 7,478,078 B2* | 1/2009 | Lunt | G06Q 30/02 |
| 7,606,687 B2* | 10/2009 | Galbreath | G06F 17/30241 701/408 |
| 7,882,039 B2* | 2/2011 | Weiss | G06F 17/30867 705/1.1 |
| 7,958,117 B2* | 6/2011 | Pettinati | G06Q 50/01 705/319 |
| 8,010,131 B2* | 8/2011 | Rothschild | H04W 76/02 455/414.1 |
| 8,019,692 B2 | 9/2011 | Rosen | |
| 8,032,126 B2* | 10/2011 | Fraccaroli | H04M 3/42008 455/414.1 |
| 8,060,389 B2 | 11/2011 | Johnson | |
| 8,060,573 B2 | 11/2011 | Leonard | |
| 8,150,416 B2 | 4/2012 | Ribaudo et al. | |
| 8,332,418 B1* | 12/2012 | Giordani | G06Q 50/01 707/706 |
| 8,386,620 B2 | 2/2013 | Chatterjee | |
| 8,423,048 B2 | 4/2013 | Morrison | |
| 8,473,386 B2 | 6/2013 | Altberg et al. | |
| 8,483,670 B2 | 7/2013 | De Vries | |
| 8,489,669 B2 | 7/2013 | Johnson | |
| 8,510,123 B2 | 8/2013 | Bonev et al. | |
| 8,559,980 B2 | 10/2013 | Pujol | |
| 8,606,297 B1* | 12/2013 | Simkhai | H04W 4/02 455/456.2 |
| 8,782,038 B2* | 7/2014 | Mishra | G06Q 30/00 705/319 |
| 2003/0191673 A1* | 10/2003 | Cohen | G06Q 10/02 705/5 |
| 2004/0220922 A1 | 11/2004 | Lovison et al. | |
| 2004/0260781 A1* | 12/2004 | Shostack | G06Q 30/02 709/207 |
| 2005/0027707 A1* | 2/2005 | Syed | G06Q 30/02 |
| 2005/0038876 A1* | 2/2005 | Chaudhuri | G06F 17/3087 709/219 |
| 2005/0086211 A1* | 4/2005 | Mayer | H04L 51/04 |
| 2006/0059160 A1* | 3/2006 | Smola | G06F 17/30861 705/319 |
| 2006/0216680 A1* | 9/2006 | Buckwalter | G09B 7/02 434/236 |
| 2007/0037574 A1* | 2/2007 | Libov | H04M 3/42357 455/435.2 |
| 2007/0282621 A1 | 12/2007 | Altman et al. | |
| 2008/0039121 A1 | 2/2008 | Muller et al. | |
| 2008/0045236 A1 | 2/2008 | Nahon et al. | |
| 2008/0062120 A1* | 3/2008 | Wheeler | G08B 25/016 345/156 |
| 2008/0086261 A1 | 4/2008 | Robinson et al. | |
| 2008/0188261 A1 | 8/2008 | Arnone | |
| 2008/0189380 A1 | 8/2008 | Bosworth et al. | |
| 2009/0082038 A1 | 3/2009 | McKiou et al. | |
| 2009/0132652 A1 | 5/2009 | Athale et al. | |
| 2010/0088246 A1 | 4/2010 | Lim | |
| 2010/0145869 A1* | 6/2010 | Brown | G06Q 10/10 705/319 |
| 2011/0142016 A1 | 6/2011 | Chatterjee | |
| 2011/0179064 A1* | 7/2011 | Russo | G06Q 10/10 707/769 |
| 2011/0238755 A1 | 9/2011 | Khan et al. | |
| 2011/0252340 A1* | 10/2011 | Thomas | G06Q 10/107 715/756 |
| 2011/0314106 A1 | 12/2011 | Bansal et al. | |
| 2011/0320495 A1 | 12/2011 | Levy-Yurista et al. | |
| 2012/0047267 A1* | 2/2012 | Mehr | G06Q 30/02 709/226 |
| 2012/0130823 A1 | 5/2012 | Levin | |
| 2012/0238235 A1 | 9/2012 | Lee | |
| 2012/0252498 A1 | 10/2012 | Trinchero et al. | |
| 2012/0254328 A1 | 10/2012 | Lee | |
| 2012/0329475 A1 | 12/2012 | Ribaudo et al. | |
| 2013/0053002 A1* | 2/2013 | Hymes | H04M 1/26 455/414.1 |
| 2013/0090980 A1 | 4/2013 | Hummel | |
| 2013/0095859 A1 | 4/2013 | De Vries | |
| 2013/0110731 A1* | 5/2013 | Wey | G06Q 50/01 705/319 |
| 2013/0145288 A1* | 6/2013 | Zadeh | G06F 3/0484 715/753 |
| 2013/0185368 A1* | 7/2013 | Nordstrom | H04L 51/32 709/206 |
| 2013/0198281 A1 | 8/2013 | Scuba et al. | |
| 2013/0225204 A1 | 8/2013 | Mathews | |
| 2013/0275881 A1 | 10/2013 | Hahm et al. | |
| 2014/0117087 A1* | 5/2014 | Aldaag | G06Q 30/02 235/380 |
| 2014/0156699 A1* | 6/2014 | Gray | H04L 67/16 707/769 |
| 2014/0317189 A1* | 10/2014 | Pedraza | H04L 67/306 709/204 |

OTHER PUBLICATIONS

The LBMA, et al., "Looking for Location-Based Love", http://thelbma.wordpress.com/2012/03/13/looking-for-location-based-love/, (Mar. 13, 2012).

The LBMA, "New Apps Facilitate Real-World Connections Via LBS", http://thelbma.wordpress.com/2012/03/19/new-apps-facilitate-real-world-connections-via-lbs/, (Mar. 19, 2012).

Followmee, "FollowMee", http://www.followmee.com/.

Unknown, "CanWeNetwork", http://www.canwenetwork.com/.

Purcher, Jack "Apple gives us a Peek into a New Social Networking App in the Works", http://www.patentlyapple.com/patently-apple/2011/06/apple-gives-a-peek-into-a-new-social-networking-app-in-the-works.html, (Jun. 16, 2011).

Unknown, "Break the Ice", http://www.crunchbase.com/company/break-the-ice.

\* cited by examiner

SYSTEM AND METHOD FOR SOCIAL NETWORKING AMONG MUTUALLY-INTERESTED USERS

FIELD OF THE INVENTION

The present invention relates generally to social networking sites and, more particularly, to social networking among users who have mutually expressed interest in one another by utilizing location based data.

BACKGROUND OF THE INVENTION

Online dating and social networking continue to grow in popularity with more and more websites and mobile device applications popping up in the market. Online dating allows people to meet and get acquainted online. In today's busy society, the ability to pre-screen candidates is very desirable, especially when the dating service pairs individuals who have already expressed a mutual interest in each other. Additionally, with society becoming more and more involved with online social networking, the amount of in-person communication is dwindling.

Current approaches typically require users to divulge personal information in order to propose matches among users. Or in other instances, all user profiles are publically available. Some systems have attempted to solve this problem by requiring a mutual confirmation before communication is allowed.

In prior systems, users who have pre-selected each other as persons-of-interest, are notified when they are in close proximity to one another. These systems fall short in the privacy and safety department because they reveal the respective users' profile identity as soon as they come within a certain radius of each other. This causes problems because if first user does not want to communicate with the second user at that time, second user has already learned of first user's identity and general location.

Other systems have attempted to solve this problem by allowing users to turn the tracking system on or off as desired. While first user could have easily avoided having her profile and location disclosed by turning off the tracking system, this is not an efficient manner of maintaining privacy while facilitating in-person encounters. By requiring users to turn on or off their system, it runs the risk of users forgetting to switch the system to the desired level. This results in missed opportunities because they forget to turn it on, or results in breaches of privacy when their profile and location are disclosed because they forget to turn the system off.

Furthermore, prior systems that keep user profiles anonymous until both users show a mutual interest in communication, require the user to open the application at their current location.

Other prior systems can generally overwhelm a user as well. Some of these systems require a lot of user inputs leading up to finding a match. Often times, multiple users will be in the same location. Just as first user is about make an in-person encounter with second user, a third user begins the meeting process with first user via the system. When this occurs, first user now has a dilemma on his hands: continue with the second user, and risk upsetting the third user; ditch the second user, obviously upsetting her, and move on with the third user; or potentially upset both users because of the competition.

Although various systems for matching people are known to the art, all, or almost all of them suffer from one or more than one disadvantage. Therefore, there is a need to provide improved systems and methods for facilitation of in-person encounters between people having interest in one another.

SUMMARY OF THE INVENTION

Briefly, and in general terms, the present invention provides computer-implemented systems and methods directed to facilitating communication between users who have indicated mutual interest in each other when they are in close proximity.

More specifically, in an exemplary embodiment, the system considers mutual interest between users and whether mutually interested users are in close proximity with each other, and generally comprises the following steps: affiliates a first and a second user with an interactive network having a plurality of members associated therewith. The system then receives and stores user selected profiles and associates those profiles with each user. Users can browse these profiles and select profiles in which they are interested. If the system receives data indicating that two users have mutually selected each other's profiles, the system pairs these users. The system receives geo positioning data from each mobile device and utilizes this data to determine if users are in close proximity. The devices themselves can detect another nearby user and the two devices can alert each other with no intervention from us or monitoring from an outside source. It is better for privacy this way we are not location aware of all our users. The app just lets the devices know when people are near. If the system determines that users are in close proximity, then the system determines if the users have mutually selected the other's profile as a profile of interest, e.g., paired users.

Upon determining that a first and second user are in close proximity, and further confirming that the first and second users have mutually selected each other's profile, the system temporarily suspends the geo position search availability in order to prevent additional user matches with the first and second users.

While the location-based search availability of the first and second users is suspended, the system generates and sends a first notification to the first and second users indicating that a mutually preselected match is nearby. This first notification does not disclose the profiles of either user; it merely prompts each user to confirm that contact with a preselected profile of interest is desirable at that time. If the system receives a mutual confirmation from both the first and second users, the system generates and sends a second notification to the devices revealing the profiles of each user and further prompts each device to confirm that contact with the now known profile is desirable. If the system receives a second mutual confirmation from the first and second users, the system opens a channel of communication between the devices to facilitate an in-person encounter.

In a detailed aspect of an exemplary embodiment, if the system does not receive a mutual confirmation after the first notification, the system determines which user(s) indicated that it was not desirable to communicate with an anonymous user at that time. Upon this determination, the system temporarily puts the determined user(s) into do not disturb mode. Since the user did not want to participate with an anonymous user, it can be assumed that the user will not respond differently to another anonymous user because of the anonymity.

After the system generates and sends the second notification, if the system does not receive mutual confirmations, the system removes the previously paired users from the paired list. The paired users are removed from the particular match list with this particular user because one user has indicated that communication with the now disclosed other user is not desirable. Both users are placed back into the available pool to search for other members but will not be paired again with each other. This eliminates the chance of the user forgetting to remove that particular user from their interest list.

In another detailed aspect of an exemplary embodiment, after the system receives the mutual confirmation after sending the first notification, the system determines the gender of each profile. The system generates and sends a second notification to the female user only, revealing the male user's profile. The notification prompts the female user to confirm communication with the particular male user is desirable. A notification is not sent to the male user unless and until the system receives a confirmation from the female user. Upon receiving confirmation from the female, the system then generates and sends a notification to the male user, revealing the female user's profile, and prompting the male user to confirm communication is desired. By revealing the male user's profile to the female, but withholding the female's profile from the male, the female user is provided with increased safety and privacy. This added layer of security for the female user prevents any scenarios where she mistakenly indicated an interest in a male's profile.

In another detailed aspect of an exemplary embodiment, before the system sends the first notification that an anonymous match is nearby, the system determines if there are multiple matches nearby. If there are multiple matches nearby, the system determines a priority match, for example, based on a ranking system. Different types of rankings systems are capable of being implemented. For example, a popularity ranking system could be utilized where the profiles with the most number of users indicating an interest in that profile would be determined the priority match. Or, a numerical ranking system where users select a number from zero to ten indicating their relative desire to encounter the particular user. The numerical system could be based on an average from all users who ranked that profile, or on a strictly personal rank. Or, the ranking system could be based on proximity. The match in closest proximity would be determined the priority match. Other ranking systems or any combination thereof could be utilized.

In another detailed aspect of an exemplary embodiment, when the system reaches the stage where it opens a channel of communication, there are different manners in which to accomplish this. For example, the channel could be through text message or SMS. Additionally, the amount of messages, characters, lines, etc., sent could be limited, in order to encourage face-to-face meetings. Or, for example, the channel could simply disclose each user's location to the other, allowing the matched users to follow the guide until they meet face-to-face. Other manners of opening a channel of communication between users could be utilized alone, or in combination thereof to accomplish this.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
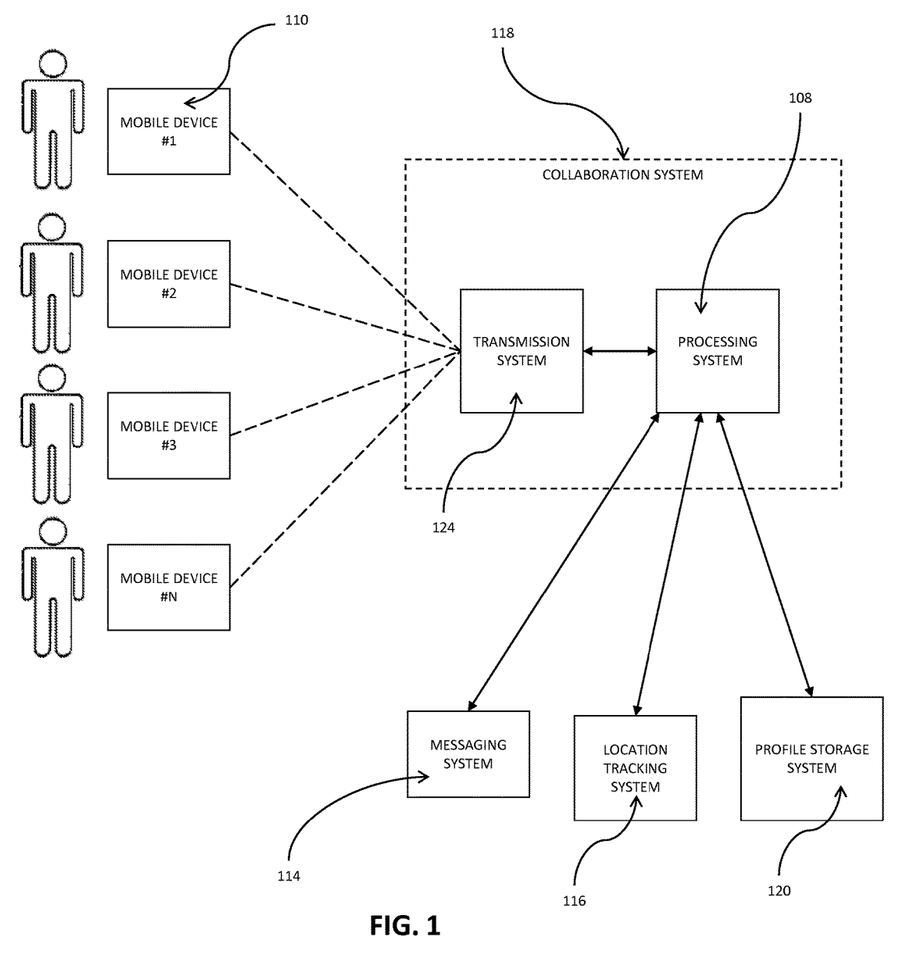
FIG. 1 is a block diagram illustrating an exemplary system architecture for implementing the features and operations described in reference to FIGS. 2-5.

Referring now to the drawings, and particularly FIG. 1, there is shown an exemplary system 118 for facilitating in-person communication between users 110 who have indicated mutual interest in each other when they are in close proximity.

The system 118 registers a plurality of users 110. The system receives and stores user created profiles in the profile storage module 120. Users 105 can browse through other registered users and indicate whether or not they have an interest in meeting the user associated with that profile. The system 118 receives each user's selections of profiles through the processing module 108, and stores them in the profile storage module 120. If two users have mutually selected each other, the system 118 anonymously pairs the profiles in the paired list 115 within the profile storage module 120. The system does not notify the users that a match exists at this time. The system notifies the users of the match once the system determines the users are in close proximity with one another using the location tracking system 116. These notifications are generated in the processing module 108 and sent to the users through the transmission system 124. This can also be accomplished by allowing the devices themselves (iPhones, etc.) to detect another nearby user and the two devices can alert each other with no intervention from the location tracking system or monitoring from an outside source. This provides for better privacy and the app just lets the devices know when mutually preselected users are near.

Mobile devices 110 can include handheld computers, personal digital assistants, cellular telephones, network appliances, cameras, smart phones, electronic tablets, enhanced general packet radio service (EGPRS) mobile phones, network base stations, media players, navigation devices, email devices, game consoles, or a combination of any two or more of these data processing devices or other data processing devices.

Figure 2:
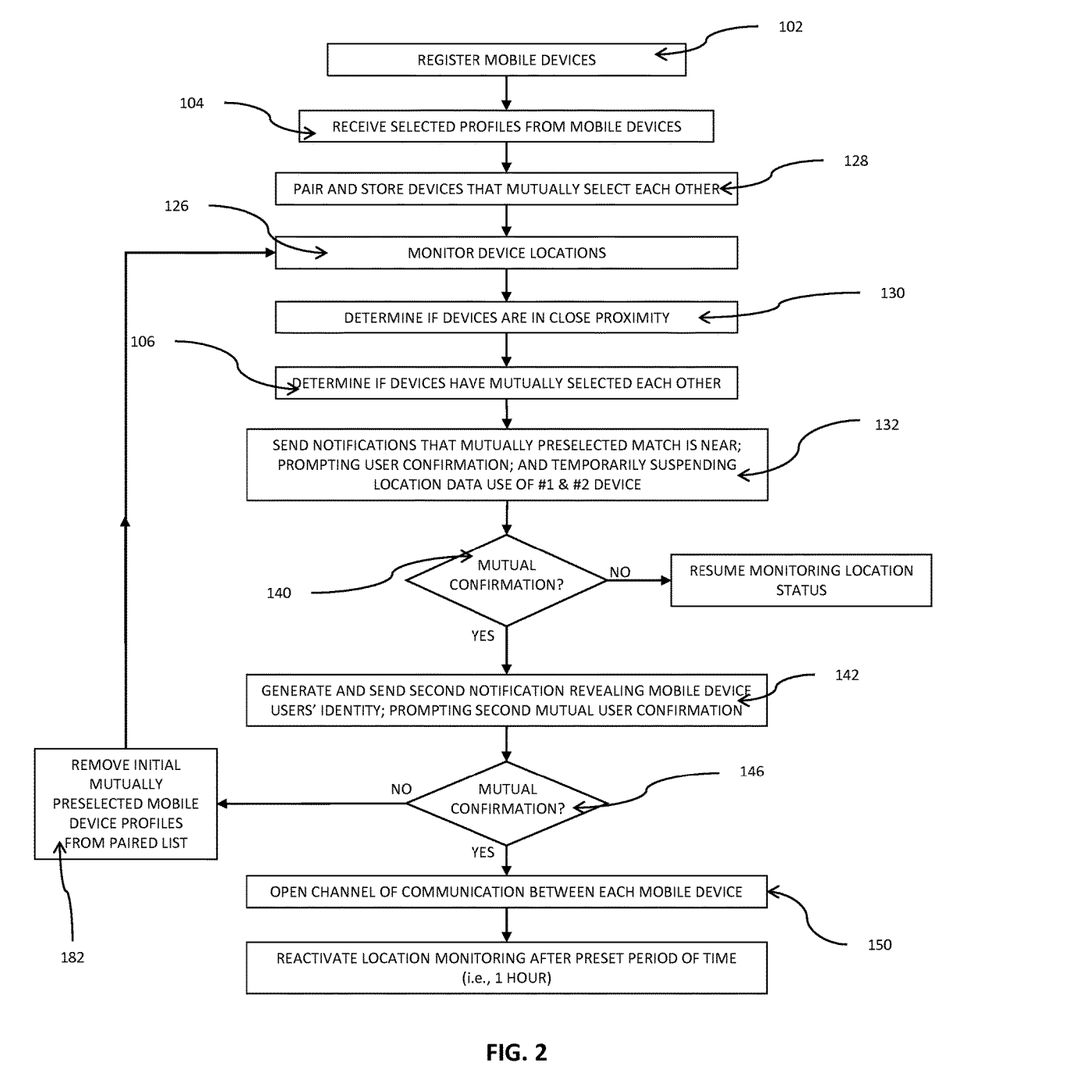
FIG. 2 is a flowchart illustrating at least one embodiment of the method for facilitating in-person communication between users as disclosed in accordance with the present invention.

Referring now to FIG. 2, at block 102, two or more users register with the system 118. A user establishes an account on the system 118 and creates a profile, which is processed and stored by the system 118. Each user can browse the stored profiles and indicate certain profiles in which they are interested in meeting. When a user indicates an interest in a particular profile, the system receives 104 and stores that indication in the profile storage module 120. When two users mutually indicate an interest in each other, the system 118 pairs and stores the users' mutual indication 128 in the profile storage module 120.

In an alternative embodiment, at the browsing stage, the user has the option of selecting whether the user is browsing for the purpose of networking, dating, etc. When users select profiles of interest, the system prompts whether the selection is based on dating or networking.

The system monitors the locations 126 of each user via the location-tracking module 122. It should be noted that this could also be accomplished by allowing the devices themselves (iPhones, etc.) to detect another nearby user and the two devices can alert each other with no intervention from the location tracking system or monitoring from an outside source. The system 118 continuously receives information data of the geo positioning 126 or Bluetooth ping of the registered users. At block 130 the system 118 determines if two users are in close proximity to each other, whether by using geo positioning data or by utilizing the devices' Bluetooth technology. If so, then at block 106 the system 118 determines whether the users were previously paired in the profile storage module 120. If both of these conditions are met, the system 110 generates and sends a first notification 132 to each user indicating that a match is nearby and prompting each user to confirm communication with the unidentified match is desired. At this stage, the system does not reveal the identities of the users. If the system receives a first mutual confirmation 140 from both users that communication is desirable, the system generates and sends a second notification 142 to each user. This time, the notification 142 reveals the profile/identity of the users and prompts each user to confirm that communication with the now disclosed profile is still desirable. If the system receives the second mutual confirmation 146 from each user, the system opens a line of communication 150. If the system does not receive second mutual confirmations 146, the system removes the initial mutually preselected devices from the match list 182 and restarts the process for each user at block 126.

Figure 3:
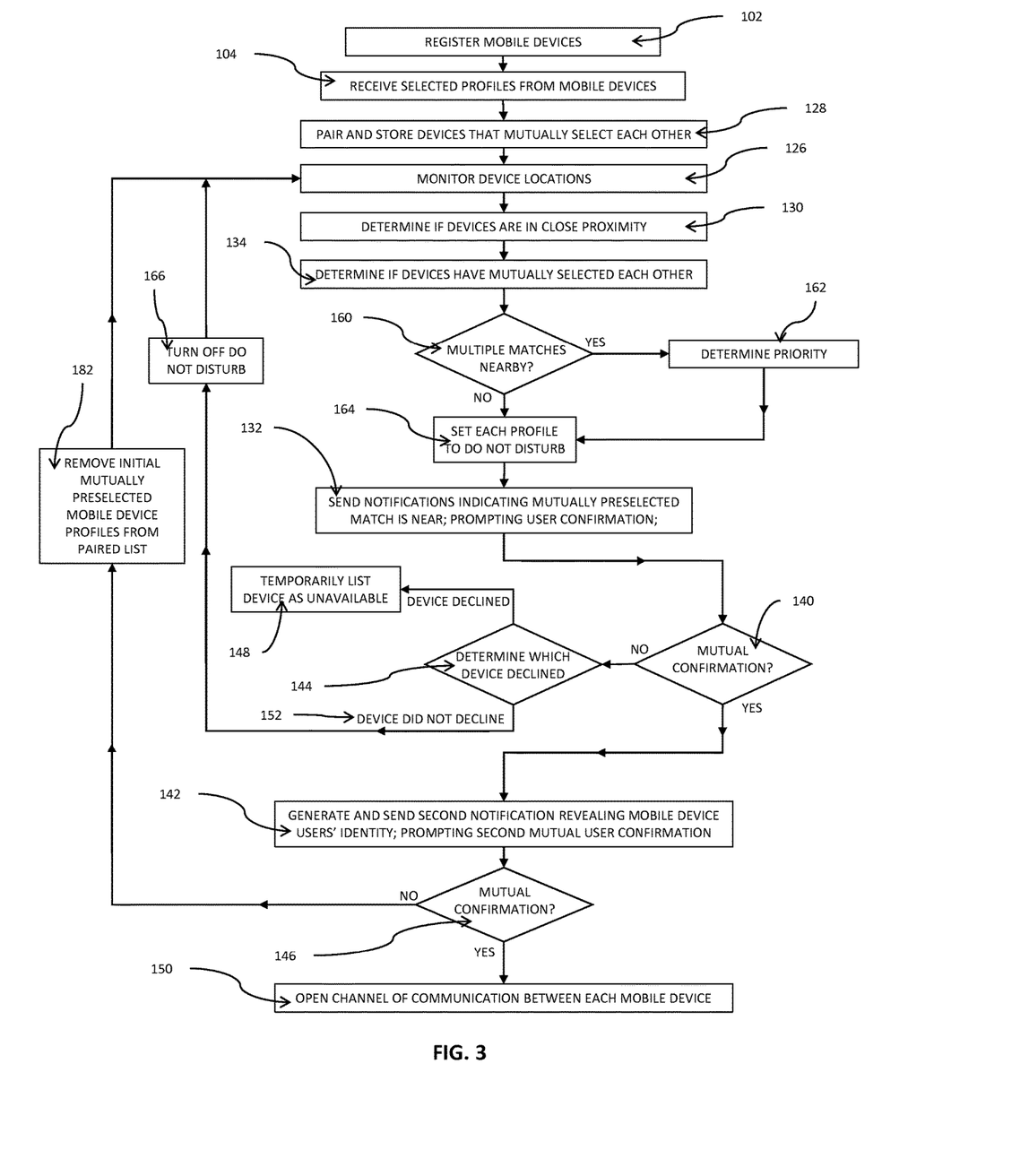
FIG. 3 is a flowchart illustrating at least one embodiment of the method for facilitating in-person communication between users as disclosed in accordance with the present invention.

Referring now to FIG. 3, a flowchart of an alternative embodiment is shown. The system 118 monitors the device locations 126, determines if devices are in close proximity 130, and determines if the devices in close proximity have mutually selected each other 134. If there are multiple matches nearby 160, the system 118 determines the priority 162 of the users using one of the alternatives described below. After prioritizing 162 which two devices best fit the criteria, the system temporarily places the selected users in a do not disturb mode 164 in order to prevent double booking. The system then generates and sends a first notification 132 to each of the selected devices indicating that a mutually preselected match is nearby and prompting user confirmation. If the system receives mutual confirmation 140 from the selected devices, the process continues on as described in FIG. 2. If there are not multiple matches/devices nearby 160, the system temporarily places the selected users in do not disturb mode 164 in order to prevent double booking if another match comes within close proximity. Then the process continues on as previously described.

In an alternative embodiment, if the system does not receive first mutual confirmations 140, the system takes note of which device(s) chose to decline 144 communication at that time. The system then puts that device in do not disturb 148 for a predetermined period of time to avoid continued notifications of nearby users. Since that user has just declined communication with an anonymous match, it can be assumed that the user does not desire addition notifications of anonymous matches in the nearby area. If a user did not decline 152 communication, the system turns off the do not disturb mode 166 for the user and restarts the process 126.

An example scenario will now be discussed for exemplary purposes. Two users, Jack and Jill, have registered with the system and created their profiles. Jack is browsing through the profiles, and when he sees Jill's profile, he selects her as a person of interest. Jill, at a later time, is browsing through profiles on the system when she comes across Jack's profile. She is interested in him, so she selects him as a person of interest. Even though both Jack and Jill have mutually selected each other, neither of them is notified of the match. Only the system is aware that Jack and Jill have expressed a mutual interest in each other.

Later on, Jack is out at the grocery store, minding his own business. Jill pulls into the parking lot of the same grocery store, and walks in. Once Jack and Jill are in close proximity, (100 yards for instance), the system generates and sends a notification to Jack and to Jill alerting them that a mutually pre-selected match is nearby. In one scenario, Jack just had a long day of work and isn't in the mood to socialize. He denies the confirmation and the system puts his device into do not disturb mode. In another scenario, Jack is intrigued, and confirms. Jill does the same. Having received mutual confirmations from Jack and Jill, the system sends another notification, revealing Jack's profile to Jill, and Jill's profile to Jack. This notification also prompts for a confirmation that communication is still desirable, since each user now knows who the match is. After seeing that Jill is the nearby match, Jack decides he does not want to communicate with her in particular. Jill was on his match list because he mistakenly added her. By denying the confirmation to connect with Jill, the system will return both Jack and Jill to the discover mode, and also remove Jack and Jill from the match list.

Similar to the scenario detailed above, except now, a third user, Joey, is involved. Jack and Jill have mutually preselected each other and are in the system's match list. Joey has selected Jill, and Jill has selected Joey. The system has Joey and Jill in the match list, as well as Jack and Jill. In the grocery store scenario, Jack and Jill are already at the store, and the system has generated the first notification. Joey arrives at the store after the first notification. Although the system has Joey and Jill on the match list, no notification is sent because Jill is currently in the process with Jack. If the first confirmation between Jack and Jill is denied by Jack, the system would then start the process with Jill and Joey, sending notifications to Jill and Joey that a match is nearby. On the other hand, if Jill is the user who denied the first confirmation between Jack and Jill, the system will put Jill into do not disturb mode, and the connection between Joey and Jill would not begin. Assuming the process between Jack and Jill gets to the second confirmation stage, if either Jack or Jill denies this second confirmation, then the system will start the process with Jill and Joey.

In the same scenario, if Jack and Joey are both at the grocery store and Jill subsequently arrives, the system would utilize a priority option to determine which user gets the notification regarding Jill.

When determining the priority 162, different prioritizing options exist. A proximity ranking could be utilized. A profile popularity ranking could be utilized. Profile popularity would be determined by how many other users have selected that profile. On a relative scale of zero to ten, based on the total number of profiles that have selected that particular profile. A profile desirability rank could be used where the processing module 108 compiles all the ranks that profile has received and outputs the average. A personalized ranking system that is unique to each user could be utilized. When the user selects a profile of interest, they indicate on a sliding scale of zero to ten, how interested they are in that profile.

Figure 4:
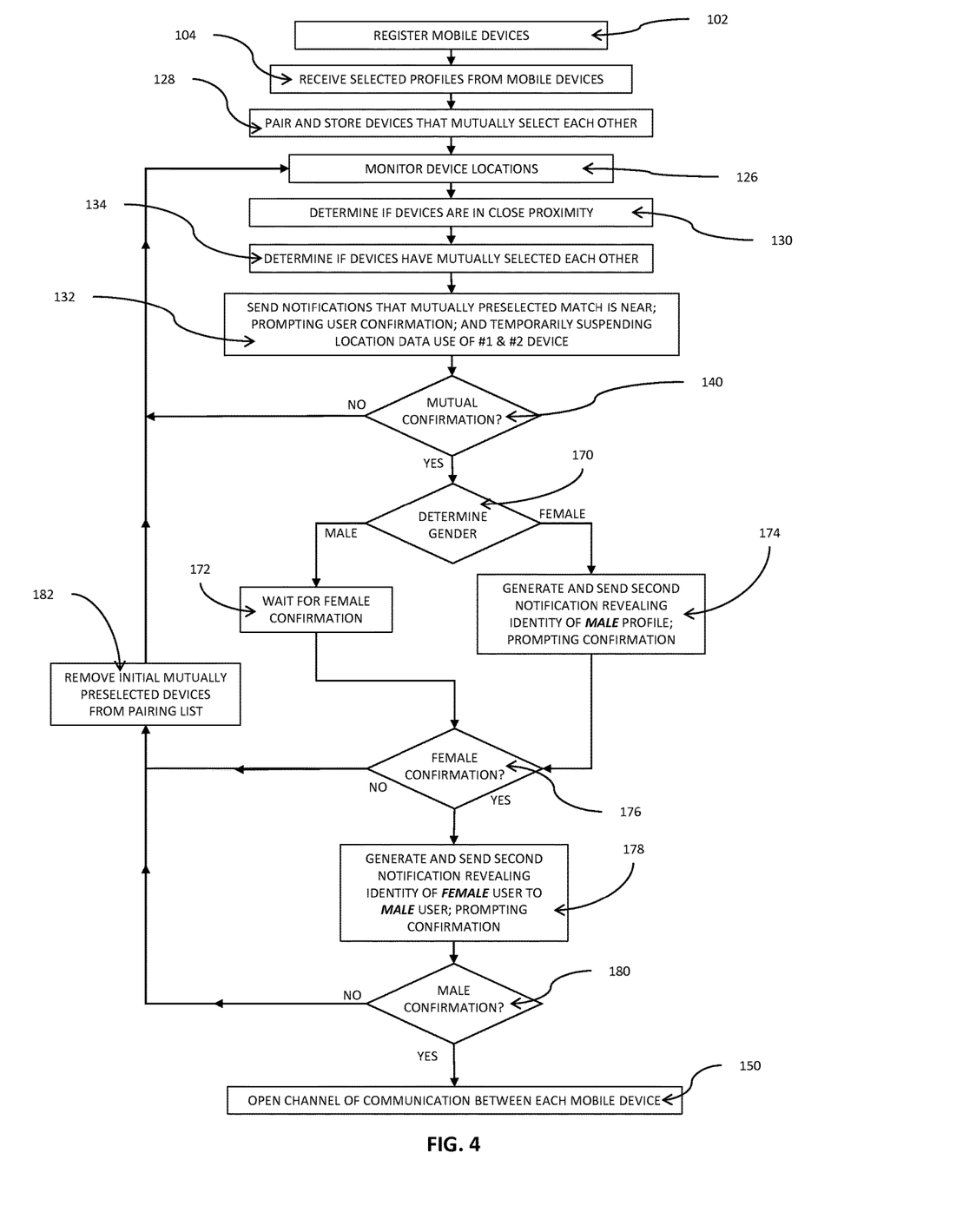
FIG. 4 is a flowchart illustrating at least one embodiment of the method for facilitating in-person communication between users as disclosed in accordance with the present invention.

Referring now to FIG. 4, a flowchart for the overall process is shown, with this particular embodiment including additional safeguards for female users. Although the female user could simply deny confirmation to the second notification 142 (as shown above) which discloses the users' profiles, the female's identity and general location would be disclosed to an undesirable user. This could easily lead to awkwardness or even confrontation with the male user because now he knows her identity and that she is within close proximity. The initial process is similar to that as explained in FIGS. 2-3, except after the first mutual confirmation 140 is received, the system 118 then takes each profile's gender into account 170. The system does not initially send a notification to the user that is determined to be male 172. Instead, the system generates and sends a second notification 174 to the identified female user 170; the notification 174 revealing the identity of the determined male user 170 and prompting the female user to confirm 176 that communication is desired with this particular profile. If the system receives a denial 176 from the female user, the system removes the female profile and the male profile from the paired list 182 and restarts the process at block 126. If system receives confirmation 176 from the female profile, the system generates and sends a second notification 178 to the identified male user, revealing the female user's identity. This second notification 178 sent to the identified male similarly prompts the male user to confirm 180 that communication with the now disclosed female is desirable. If the system receives confirmation 180 from the male user, then the system has received mutual confirmations from both the male 180 and female 176 users, in which case the system opens a channel of communication 150 between each user.

Figure 5A:
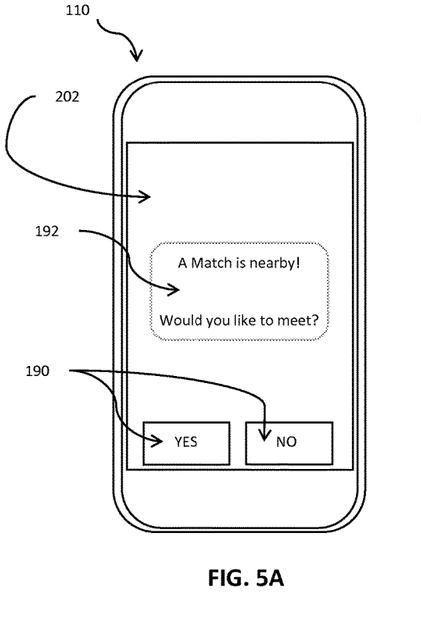
FIGS. 5A-D illustrate example user device screen displays provided by an example embodiment as disclosed in accordance with the present invention.
Figure 5B:
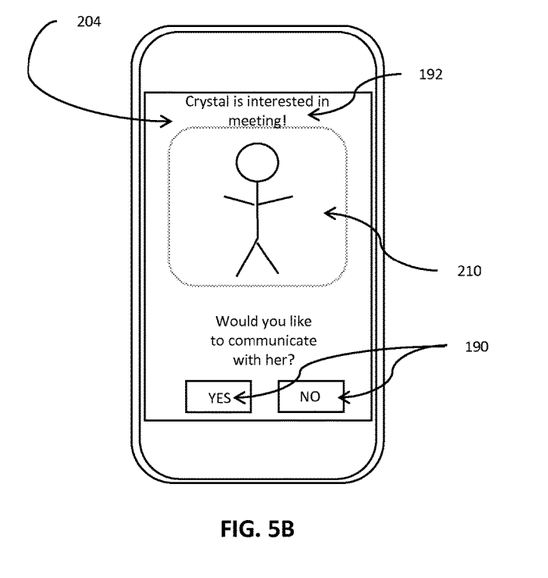
Figure 5C:
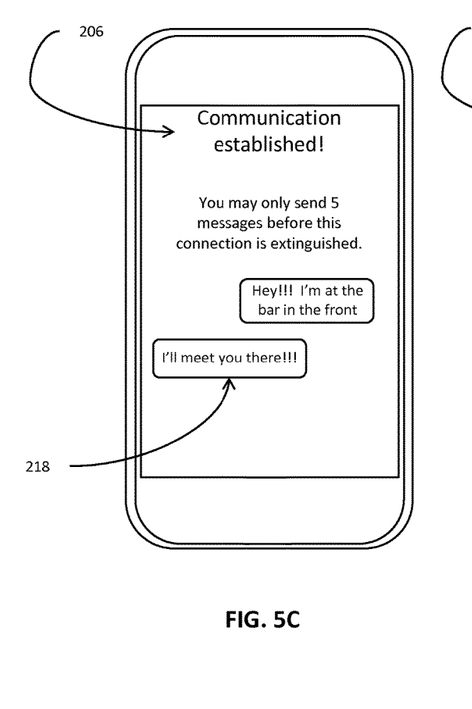
Figure 5D:
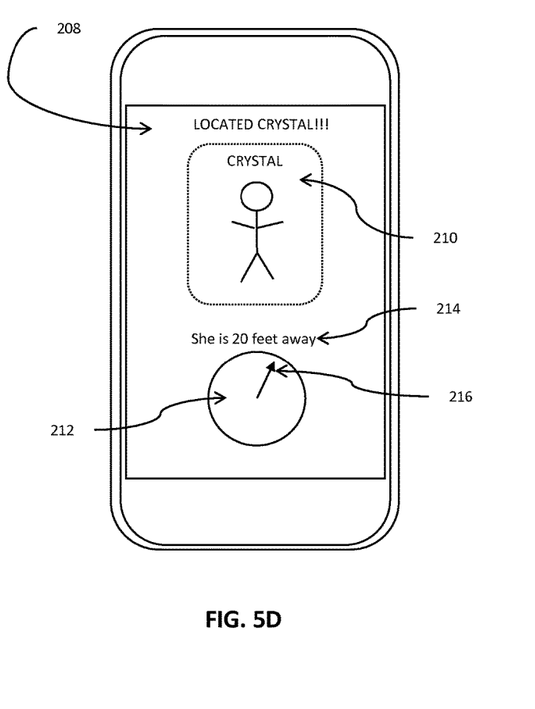

Referring now to FIGS. 5A-D, and generally to FIG. 1, FIG. 5A is an example of the user display 202 on a mobile device 110 utilized for notifying 192 and prompting 190 the initial confirmation 140 in which the identities of the profiles remain undisclosed. FIG. 5B is an example of the user display 204 utilized for notifying 192 and prompting 190 the second confirmation 146 when the user identities are revealed by displaying the user profiles 210. FIG. 5C is an example of the user display 206 utilized once the system 118 has opened a line of communication 150. In this example, the method of communication is via text message 218 through the message system 114. In this particular embodiment, each user is limited to sending five messages in order to encourage the matched users to meet in-person. FIG. 5D is an alternative example depicting the user display 208 once the system 118 has opened a line of communication 150. In this embodiment, the user display 208 includes a compass-like indicator 212 that shows how far away 214 the other device is, and in what direction 216. The system 118 uses the location monitoring system 116 and the processing module 108 to transmit the locations of the matched users to each other through the transmission system 124.

It should be appreciated from the foregoing that the present invention provides computer-implemented systems and methods directed to facilitating communication between users who come in close proximity and who have indicated a mutual interest in meeting each other.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A computer-implemented method for facilitating communication among mutually-interested users, comprising:
receiving geo positioning data or proximity based data via an interactive communications network from mobile devices of a plurality of users;
determining whether a first user and a second user are in geographic proximity to each other;
determining whether the first user and the second user are a match in that the first user and the second user have previously selected each other, upon a review of corresponding user profiles;
upon the determination the first user and the second user are a match in that the first user and the second user have previously selected each other, upon a review of the corresponding user profiles, temporarily suspending the availability of the first user and the second user for matching purposes with other users;
transmitting a first notification to the first user and the second user to indicate that a match is nearby, in which the first notification does not identify the corresponding user profile; the first notification prompting each user to confirm that contact with a pre-approved matched user is desired;
upon receiving a first mutual confirmation from both the first user and the second user, sending a second notification to each of the first user and the second user; the second notification revealing to the first user and the second user their respective user profiles and further prompting each user to confirm that contact is desired; and
upon receiving a second mutual confirmation from both the first user and the second user, opening up a channel of communication between the first user and the second user.

2. The computer implemented method as defined in claim 1, wherein a priority ranking is utilized when multiple matched users are nearby.

3. The computer implemented method as defined in claim 1, wherein the temporary suspension of availability remains in effect until the first user and/or the second user respond to the first notification that contact is not desired.

4. The computer implemented method as defined in claim 3, wherein the temporary suspension of availability remains in effect for a predetermined duration upon receiving the second mutual confirmation.

5. The computer implemented method as defined in claim 1, wherein upon determination that there is not a first mutual confirmation, determining which of the first user and/or the second user did not confirm, and continuing the temporarily suspension of the availability of the non-confirming user(s) for matching purposes, and turning back on the availability of the confirming user.

6. The computer implemented method as defined in claim 5, wherein upon determination that there is not a second mutual confirmation from both the first user and the second user, determining which of the first user and/or the second user did not confirm, and continuing the temporarily suspension of the availability of the non-confirming user(s) for matching purposes with other users affiliated with the system, and turning back on the availability of the confirming user.

7. The computer implemented method as defined in claim 1, wherein the channel of communication is via text message.

8. The computer implemented method as defined in claim 7, wherein the first user and the second user are limited to sending a predetermined limited amount of messages.

9. The computer implemented method as defined in claim 1, wherein the channel of communication is means for disclosing the first and second users' location to each other.

10. The computer implemented method as defined in claim 9, wherein the user display is a compass-like indicator that points in the direction of the other user and displays a distance measurement.

11. A computer-implemented method for facilitating communication among mutually-interested users, comprising:
    affiliating a plurality of users via an interactive communications network with a system; and
    receiving geo positioning data from affiliated users of the users in order to determine whether a first user and a second user are in geographic proximity to each other; and
    determining whether the first user and the second user are a match in that the first user and the second user have previously selected each other, upon a review of corresponding user profiles;
    upon the determination the first user and the second user are a match in that the first user and the second user have previously selected each other, upon a review of the corresponding user profiles, temporarily suspending the availability of the first user and the second user for matching purposes with other users affiliated with the system;
    transmitting a first notification to the first user and the second user to indicate that a match is nearby, in which the first notification does not identify the corresponding user profile; the first notification prompting each user to confirm that contact with a pre-approved matched user is desired;
    receiving a first mutual confirmation from both the first user and the second user;
    wherein one of the first user and the second user is female and the other is male, sending a second notification to the user determined to be female; the second notification revealing the profile/identity of the male user to the female user and further prompting the female user to confirm that contact with the now identified matched male user is desired;
    upon receiving a confirmation from the female user, sending the second notification to the male user revealing the identity/profile of the female user to the male user and further prompting the male user to confirm that contact with the now identified matched female user is desired;
    upon receiving a confirmation from the male user and the female user, opening up a channel of communication between the first and second users.

12. The computer implemented method as defined in claim 11, wherein a priority module is utilized when multiple matched users are nearby.

13. The computer implemented method as defined in claim 11, wherein the temporary suspension of availability remains in effect until he first user and/or the second user respond to the first notification that contact is not desired.

14. The computer implemented method as defined in claim 13, wherein the temporary suspension of availability remains in effect for a predetermined duration upon receiving the second mutual confirmation.

15. The computer implemented method as defined in claim 11, wherein upon determination that there is not a first mutual confirmation, determining which of the first user and/or the second user did not confirm, and continuing the temporarily suspension of the availability of the non-confirming user(s) for matching purposes, and turning back on the availability of the confirming user.

16. The computer implemented method as defined in claim 15, wherein upon determination that there is not a second mutual confirmation from both the first user and the second user, determining which of the first user and/or the second user did not confirm, and continuing the temporarily suspension of the availability of the non-confirming user(s) for matching purposes with other users affiliated with the system, and turning back on the availability of the confirming user.

17. The computer implemented method as defined in claim 11, wherein the channel of communication is via text message.

18. The computer implemented method as defined in claim 17, wherein the first user and the second user are limited to sending a predetermined limited amount of messages.

19. The computer implemented method as defined in claim 11, wherein the channel of communication is means for disclosing the first and second users' location to each other.

20. The computer implemented method as defined in claim 19, wherein the user display is a compass-like indicator that points in the direction of the other user and displays a distance measurement.

\* \* \* \* \*